(12) United States Patent
Yu

(10) Patent No.: US 9,354,843 B2
(45) Date of Patent: May 31, 2016

(54) APPARATUS AND METHOD FOR GENERATING PARTIAL PRODUCT FOR POLYNOMIAL OPERATION

(75) Inventor: Hyeong-Seok Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 13/588,250

(22) Filed: Aug. 17, 2012

(65) Prior Publication Data

US 2013/0226982 A1   Aug. 29, 2013

(30) Foreign Application Priority Data

Feb. 29, 2012   (KR) .................. 10-2012-0021304

(51) Int. Cl.
*G06F 7/533* (2006.01)

(52) U.S. Cl.
CPC .................... *G06F 7/5338* (2013.01)

(58) Field of Classification Search
None
See application file for complete search history.

(56) References Cited

U.S. PATENT DOCUMENTS

| | | | |
|---|---|---|---|
| 5,150,322 A * | 9/1992 | Smith | ............... G06F 7/5275 708/628 |
| 5,245,564 A | 9/1993 | Quek et al. | |
| 5,446,651 A * | 8/1995 | Moyse et al. | ............ 708/630 |
| 5,944,776 A | 8/1999 | Zhang et al. | |
| 6,269,385 B1 * | 7/2001 | Han | ............... G06F 7/4876 708/497 |
| 6,421,699 B1 * | 7/2002 | Dhong et al. | ............ 708/630 |
| 8,078,662 B2 | 12/2011 | Mathew et al. | |
| 2003/0196177 A1 * | 10/2003 | Parhi et al. | ................. 716/1 |
| 2003/0208519 A1 | 11/2003 | Garrett et al. | |
| 2007/0203962 A1 | 8/2007 | Hirairi | |
| 2008/0222227 A1 | 9/2008 | Chiang | |

FOREIGN PATENT DOCUMENTS

| | | |
|---|---|---|
| GB | 2 359 677 A | 8/2001 |
| KR | 10-2008-0029906 A | 4/2008 |
| KR | 10-2009-0070428 A | 7/2009 |

OTHER PUBLICATIONS

Extended European Search Report issued Jul. 9, 2013 in counterpart European Patent Application No. 13156769.5 (7 pages, in English).

* cited by examiner

*Primary Examiner* — Michael D Yaary
(74) *Attorney, Agent, or Firm* — NSIP Law

(57) ABSTRACT

An apparatus and a method for generating a partial product for a polynomial operation are provided. The apparatus includes first encoders, each of the first encoders configured to selectively generate and output one of mutually exclusive values based on two inputs. The apparatus further includes a second encoder configured to generate and output two candidate partial products based on an output from a first one of the first encoders that is provided at a reference bit position of the inputs, an output from a second one of the first encoders that is provided at an upper bit position of the inputs, and a multiplicand. The apparatus further includes a multiplexer configured to select one of the candidate partial products output from the second encoder.

18 Claims, 6 Drawing Sheets

APPARATUS AND METHOD FOR GENERATING PARTIAL PRODUCT FOR POLYNOMIAL OPERATION

CROSS-REFERENCE TO RELATED APPLICATION(S)

This application claims the benefit under 35 U.S.C. §119(a) of Korean Patent Application No. 10-2012-0021304, filed on Feb. 29, 2012, in the Korean Intellectual Property Office, the entire disclosure of which is incorporated herein by reference for all purposes.

BACKGROUND

1. Field

The following description relates to an apparatus and a method for generating a partial product for a polynomial operation.

2. Description of the Related Art

Image processing devices and a variety of multimedia devices may require operations of transcendental functions, such as the trigonometric function, the logarithm, and the exponential function, as well as basic operations, such as addition, subtraction, multiplication, and division. The complex transcendental functions may be designed to be decomposed into the basic operations to be easily-processed in a stage of compiling software. However, such decompositions may take a far longer period of time, compared to performing the transcendental functions in a dedicated processing unit mounted in a processor. Since processing time for image information serves as a barometer of performance of an image processing device, processors with dedicated processing units have been utilized to perform transcendental functions in processing the image information.

To process the transcendental functions in a digital device, multiplication and addition operations may be performed. A result of a transcendental function may be obtained from polynomial expansion. The polynomial may be made up of several monomials, each being constructed from the multiplication of a constant and several variables. In light of more basic operations, the polynomial may be formed by a series of operations of multiplication and a sum of the multiplication results. A multiplication operation as a basic arithmetic operation requires a long period of processing time. Thus, reducing the processing time for a multiplication operation may result in decreasing an entire processing time for a polynomial expansion, thereby allowing the implementation of a faster digital device.

SUMMARY

In one general aspect, there is provided an apparatus configured to generate a partial product for a polynomial operation, including first encoders, each of the first encoders configured to selectively generate and output one of mutually exclusive values based on two inputs. The apparatus further includes a second encoder configured to generate and output two candidate partial products based on an output from a first one of the first encoders that is provided at a reference bit position of the inputs, an output from a second one of the first encoders that is provided at an upper bit position of the inputs, and a multiplicand. The apparatus further includes a multiplexer configured to select one of the candidate partial products output from the second encoder.

The inputs may be related to a multiplier.

The second encoder may be further configured to generate and output a carry estimation value based on the output from the first one of the first encoders and the output from the second one of the first encoders.

The apparatus may further include another second encoder configured to generate and output another two candidate partial products based on an output from another first one of the first encoders that is provided at another reference bit position of the inputs, an output from another second one of the first encoders that is provided at another upper bit position of the inputs, the output from the second one of the first encoders, and the multiplicand. The other second encoder may be further configured to generate another carry estimation value based on the output from the other first one of the first encoders, the output from the other second one of the first encoders, and the output from the second one of the first encoders. The apparatus may further include another multiplexer configured to select one of the other candidate partial products output from the other second encoder based on the carry estimation value output from the second encoder.

The apparatus may further include another second encoder configured to generate two candidate encoding values and another carry estimation value based on an output from another first one of the first encoders that is provided at another reference bit position of the inputs, an output from another second one of the first encoders that is provided at another upper bit position of the inputs, and the output from the second one of the first encoders. The other second encoder may be further configured to multiply each of the candidate encoding values by the multiplicand to generate and output another two candidate partial products. The apparatus may further include another multiplexer configured to select one of the other candidate partial products output from the other second encoder based on the carry estimation value output from the second encoder.

The candidate encoding values may include a first candidate encoding value for an event in which a carry occurs in a lower bit of the inputs, and a second candidate encoding value for an event in which the carry does not occur in the lower bit.

The other second encoder may be further configured to generate the candidate encoding values and the other carry estimation value based on Radix-4 Booth encoding.

Each of the second encoder and the other second encoder may be provided at an even number bit position the inputs.

The inputs may include bits of precedence partial products generated in a series of multiplication operations.

Each of the first encoders may be provided at a bit position of the inputs.

The mutually exclusive values may include a P (Propagation) value, a G (Generation) value, and T (Termination) value.

The P value may indicate a state in which a carry occurs in a reference bit of the inputs in response to a carry occurring in a lower bit of the inputs. The G value may indicate a state in which the carry occurs in the reference bit. The T value may indicate a state in which the carry does not occur in the reference bit even when the carry occurs in the lower bit.

In another general aspect, there is provided a method of generating a partial product for a polynomial operation, including generating Propagation Generation Termination (PGT) values based on two inputs, each of the PGT values being one of mutually exclusive values, and the PGT values being at a reference bit position and an upper bit position, respectively, of the inputs. The method further includes generating two candidate partial products based on the PGT values and a multiplicand. The method further includes selecting one of the candidate partial products.

The method may further include generating a carry estimation value based on the PGT values.

The method may further include generating other PGT values based on the inputs, each of the other PGT values being one of the mutually exclusive values, and the other PGT values being at another reference bit position, another upper bit position, and the upper bit position, respectively, of the inputs. The method may further include generating two candidate encoding values and another carry estimation value based on the other PGT values. The method may further include multiplying each of the candidate encoding values by the multiplicand to generate another two candidate partial products. The method may further include selecting one of the other candidate partial products based on the carry estimation value.

A non-transitory computer-readable storage medium stores a program including instructions to cause a computer to implement the method.

Other features and aspects may be apparent from the following detailed description, the drawings, and the claims.

Figure 1:
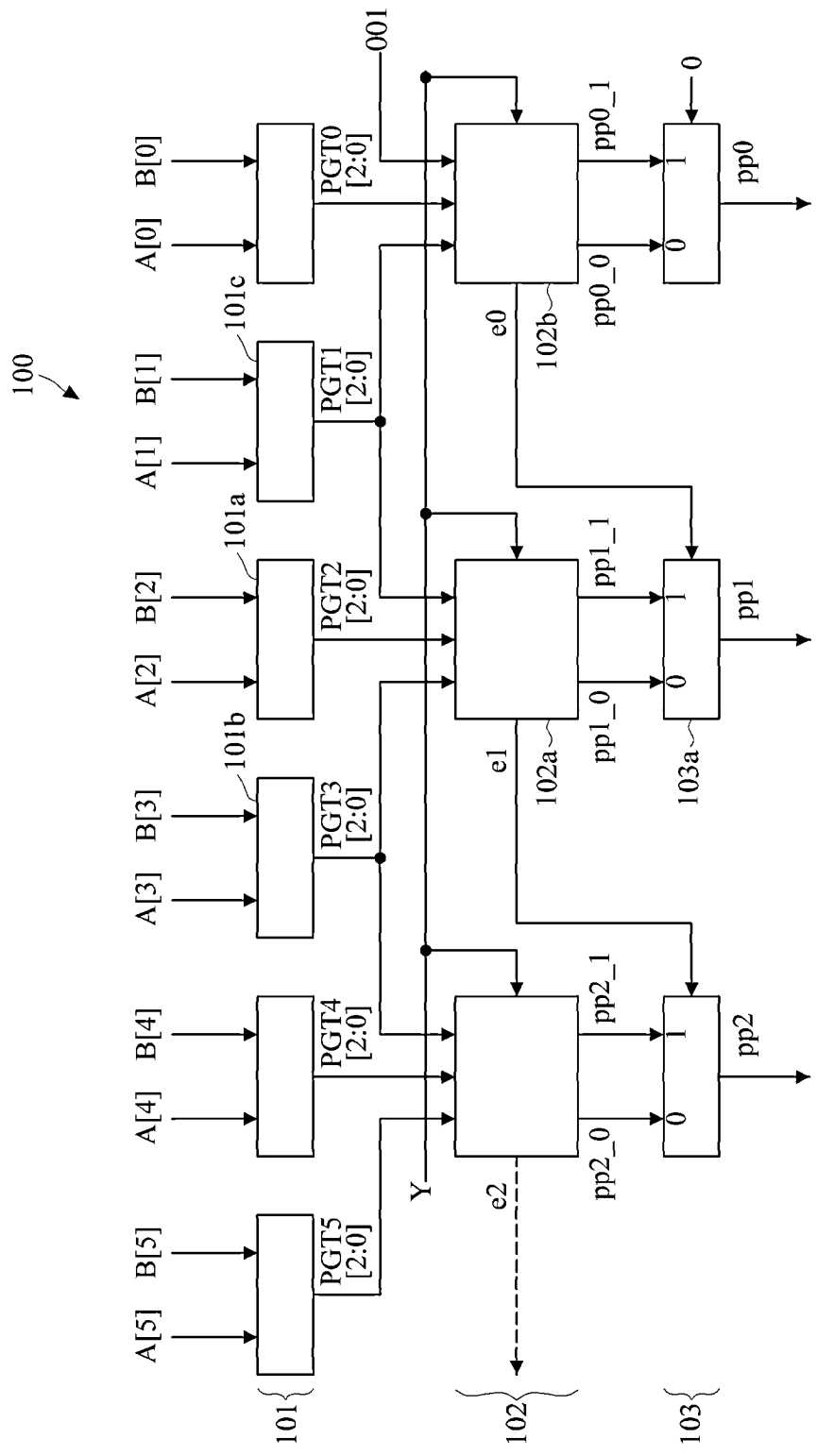
FIG. 1 is a diagram illustrating an example of an apparatus configured to generate a partial product for a polynomial operation.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an apparatus 100 configured to generate a partial product for a polynomial operation. The apparatus 100 includes a first encoder 101, a second encoder 102, and a multiplexer 103.

The first encoder 101 receives two inputs related to a multiplier. For example, if the multiplier is X, the first encoder 101 receives inputs A and B that are related to the multiplier X. Each of the inputs A and B may be a precedence partial product generated in a series of multiplication operations. For example, the multiplier X may be represented by a sum of the inputs A and B.

The first encoder 101 is provided at each bit position of a corresponding bit of input bits. For example, if the inputs A and B are precedence partial products, each including a 6 bit-length, six first encoders are provided at bit positions of the corresponding input bits. In this example, an n-th first encoder 101a receives input bits A[2] and B[2]. A[2] is a third bit of one of the precedence partial products related to the multiplier X, and B[2] is a third bit of another one of precedence partial products related to the multiplier X. For convenience of explanation, a bit position corresponding to an n-th bit will be referred to as a reference bit position.

The first encoder 101 outputs one of three mutually exclusive values based on the received inputs. For example, the first encoder 101 outputs a propagation (P) value, a generation (G) value, or a termination (T) as a PGT value. The PGT value is a value related to an occurrence of a carry. The P value indicates a state in which the carry occurs in a reference bit of the inputs in response to a carry occurring in a lower bit of the inputs, the G value indicates a state in which the carry occurs in the reference bit, and the T value indicates a state in which the carry does not occur in the reference bit even when the carry occurs in the lower bit. For example, the n-th first encoder 101a selectively outputs, as an PGT value, the P value (for example, '100'), the G value (for example, '010'), or the T value (for example, '001') based on the input bits A[2] and B[2]. Although the PGT value in the example of FIG. 1 is 3-bit data, this is only an example, and other lengths of the PGT value may be used, as understood by one of ordinary skill in the art.

The second encoder 102 receives PGT values output from the adjacent first encoder 101. For example, an n-th second encoder 102a receives the PGT value output from the n-th first encoder 101a provided at the reference bit position, an PGT value output from an (n+1)-th first encoder 101b provided at an upper bit position, and an PGT value output from an (n−1)-th first encoder 101c provided at a lower bit position.

The second encoder 102 further receives a multiplicand. If the multiplicand is Y, the second encoder 102 receives $Y_n$ and $Y_{n-1}$. $Y_n$ indicates an original multiplicand, and $Y_{n-1}$ indicates a multiplicand shifted by one bit.

The second encoder 102 generates two candidate partial products and a carry estimation value based on the PGT values output from the first encoder 101 and the multiplicand Y. For example, the n-th second encoder 102a receives the PGT value output from the n-th first encoder 101a, the PGT value output from the (n+1)-th first encoder 101b, and the PGT value output from the (n−1)-th first encoder 101c. The n-th second encoder 102a generates two candidate encoding values and a carry estimation value e1 based on the Radix-4 Booth encoding, and then generates two candidate partial products pp1_0 and pp1_1 by multiplying each of the candidate encoding values by the multiplicand Y. One of the candidate partial products pp1_0 and pp1_1 becomes a partial product if the carry occurs in the lower bit, and the other becomes a partial product if the carry does not occur in the lower bit.

The second encoder 102 is provided at a bit position corresponding to an even number bit of the Radix-4 Booth encoding. For example, the second encoder 102 is provided at each of positions corresponding to (n−2)-th, n-th, and (n+2)-th bits.

The multiplexer 103 receives the candidate partial products output from the second encoder 102 provided at a bit position, and a carry estimation value output from the second encoder 102 provided at a lower bit position. For example, an n-th multiplexer 103a receives the candidate partial products pp1_0 and pp1_1 output from the n-th second encoder 102a and a carry estimation value e0 output from an (n−2)-th second encoder 102b.

The multiplexer 103 selects one of the candidate partial products output from the second encoder 102 at the bit position based on the carry estimation value output from the second encoder 102 at the lower bit position. For example, the n-th multiplexer 103a selects one of the candidate partial products pp1_0 and pp1_1 output from the n-th second encoder 102a based on the carry estimation value e0 output from the (n−2)-th second encoder 102b.

In an example in which the first encoder 101 outputs, as the PGT value, one of the P, G, and T values based on the inputs A and B, a relationship between the inputs A and B and the PGT value may be defined by Expression 1 below.

$$P_n = A_n \text{ XOR } B_n$$

$$G_n = A_n \text{ AND } B_n$$

$$T_n = \sim(A_n \text{ OR } B_n) \tag{1}$$

$P_n$, $G_n$, and $T_n$ denote respective bit values of the PGT value. Expression 1 may be represented by Table 1 below.

TABLE 1

| Input (A, B) | | Output | | | PGT Value |
|---|---|---|---|---|---|
| 0 | 0 | 0 | 0 | 1 | T |
| 0 | 1 | 1 | 0 | 0 | P |
| 1 | 0 | 1 | 0 | 0 | P |
| 1 | 1 | 0 | 1 | 0 | G |

As shown in Expression 1 and Table 1, an PGT value is one of three mutually exclusive values with respect to two inputs. The first encoder 101 operating in accordance with Expression 1 and Table 1 may be implemented using various methods.

Figure 2:
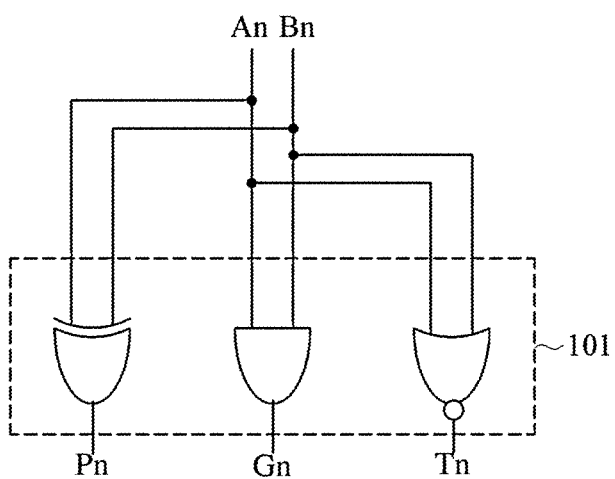
FIG. 2 is a diagram illustrating an example of a first encoder.

FIG. 2 is a diagram illustrating an example of the first encoder 101. The first encoder 101 includes an XOR logic gate, an AND logic gate, and an NOR logic gate. Each of the XOR logic gate, the AND logic gate, and the NOR logic gate receive two inputs An and Bn. The XOR logic gate outputs a first bit value Pn of an PGT value based on the inputs An and Bn, the AND logic gate outputs a second bit value Gn of the PGT value based on the inputs An and Bn, and the NOR logic gate outputs a third bit value Tn of the PGT value based on the inputs An and Bn. Although the first encoder 101 in the example of FIG. 2 includes the XOR logic gate, the AND logic gate, and the NOR logic gate, this is only an example, and other logic gates may be used, such as an OR logic gate, an NAND logic gate, and any other logic gate known to one of ordinary skill in the art.

Figure 3:
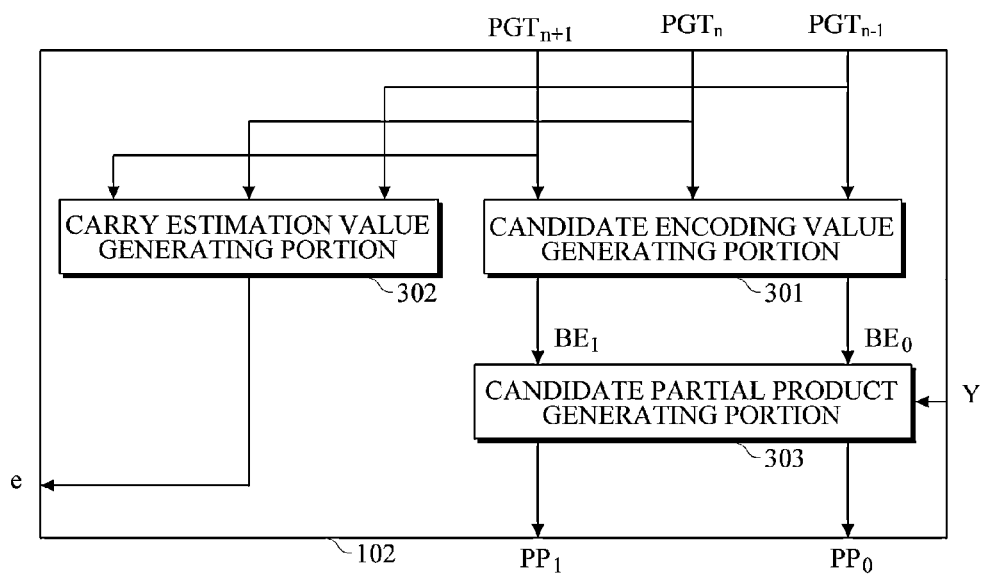
FIG. 3 is a diagram illustrating an example of a second encoder.

FIG. 3 is a diagram illustrating an example of the second encoder 102. The second encoder 102 includes a candidate encoding value generating portion 301, a carry estimation value generating portion 302, and a candidate partial product generating portion 303.

The candidate encoding value generating portion 301 and the carry estimation value generating portion 302 receive PGT values $PGT_{n+1}$, $PGT_n$, and $PGT_{n-1}$ output from three adjacent first encoders (e.g., 101a, 101b, and 101c of FIG. 1), respectively. The candidate encoding value generating portion 301 generates two candidate encoding values $BE_1$ and $BE_0$ based on the PGT values $PGT_{n+1}$, $PGT_n$, and $PGT_{n-1}$, and the carry estimation value generating portion 302 generates a carry estimation value e based on the PGT values $PGT_{n+1}$, $PGT_n$, and $PGT_{n-1}$. For example, the candidate encoding value generating portion 301 and the carry estimation value generating portion 302 may perform encoding as shown in Table 2 below.

TABLE 2

| PGT | $BE_0$ | $BE_1$ | e |
|---|---|---|---|
| PPP | 0 | 0 | 0 |
| PPG | 0 | 1 | 1 |
| PPT | −1 | 0 | 0 |
| PGP | 1 | 1 | 1 |
| PGG | 1 | 2 | 1 |
| PGT | 0 | 1 | 1 |
| PTP | −1 | −1 | 0 |
| PTG | −1 | 0 | 0 |
| PTT | −2 | −1 | 0 |
| GPP | −2 | −2 | 1 |
| GPG | −2 | −1 | 1 |
| GPT | 1 | 2 | 0 |
| GGP | −1 | −1 | 1 |
| GGG | −1 | 0 | 1 |
| GGT | −2 | −1 | 1 |
| GTP | 1 | 1 | 0 |
| GTG | 1 | 2 | 0 |
| GTT | 0 | 1 | 0 |
| TPP | −2 | −2 | 1 |
| TPG | −2 | −1 | 1 |
| TPT | 1 | 2 | 0 |
| TGP | −1 | −1 | 1 |
| TGG | −1 | 0 | 1 |
| TGT | −2 | −1 | 1 |
| TTP | 1 | 1 | 0 |
| TTG | 1 | 2 | 0 |
| TTT | 0 | 1 | 0 |

In an example of Table 2, PPP in an PGT field indicates that all of PGT values $PGT_{n+1}$, $PGT_n$, and $PGT_{n-1}$ output from respective bit positions are P values. As shown in Table 2, the candidate encoding value generating portion 301 generates the candidate encoding values $BE_1$ and $BE_0$, each including one of values '−2', '−1', '0', '1', and '2', and the carry estimation value generating portion 302 generates the carry estimation value e, which is either '0' or '1'.

The candidate partial product generating portion 303 generates two candidate partial products $PP_0$ and $PP_1$ based on the candidate encoding values BE0 and BE1 and a multiplicand Y. For example, the candidate partial product generating portion 303 multiplies each of the candidate encoding values $BE_1$ and $BE_0$ by the multiplicand Y to generate the candidate partial products $PP_0$ and $PP_1$.

The second encoder 102 operating in accordance with Table 2 may be implemented using various methods. Another example of the second encoder 102 is provided as follows.

The encoding result as shown in Table 2 may be used to acquire a final partial product. For example, a design scheme may define the following three instructions based on the candidate encoding values '−2', '−1', '0', '1', and '2', and may generate the partial product based on the defined instructions.

Shift: corresponds to the candidate encoding values '+2' and '−2', and shifts an input value (e.g., the multiplicand Y) by one bit position Zero: corresponds to the candidate encoding value '0', and outputs '0'

Negation: corresponds to the candidate encoding values '−1' and '−2', and obtains a complement of an input value (e.g., the multiplicand Y).

Conditions (e.g., candidate encoding values) of occurrences of these three instructions are shown in Table 3 below.

TABLE 3

| Encoding | Negation | Shift | Zero | Partial Product |
|---|---|---|---|---|
| 2 | X | 1 | 1 | $Y_{n-1}$ |
| 1 | 0 | 0 | X | $Y_n$ |
| 0 | X | 1 | 0 | 0 |

TABLE 3-continued

| Encoding | Negation | Shift | Zero | Partial Product |
|---|---|---|---|---|
| −1 | 1 | 0 | X | $\sim Y_n$ |
| −2 | 1 | 1 | 1 | $\sim Y_{n-1}$ |

Table 3 shows values defined for Negation, Zero, and Shift, which are used in a logical structure to generate a partial product. Each value includes a logical state of '0' or '1', and 'X' is any value under a "dont-care" condition. Thus, by adequately adjusting 'X' as a logical value as shown in Table 3, logical expressions for Negation, Shift, and Zero may be easily acquired from PGT values. Examples of such logical expressions are shown in Tables 4 through 6 below.

TABLE 4

| PGT | Shift0 | Shift1 |
|---|---|---|
| PPP | 1 | 1 |
| PPG | 1 | 0 |
| PPT | 0 | 1 |
| PGP | 0 | 0 |
| PGG | 0 | 1 |
| PGT | 1 | 0 |
| PTP | 0 | 0 |
| PTG | 0 | 1 |
| PTT | 1 | 0 |
| GPP | 1 | 1 |
| GPG | 1 | 0 |
| GPT | 0 | 1 |
| GGP | 0 | 0 |
| GGG | 0 | 1 |
| GGT | 1 | 0 |
| GTP | 0 | 0 |
| GTG | 0 | 1 |
| GTT | 1 | 0 |
| TPP | 1 | 1 |
| TPG | 1 | 0 |
| TPT | 0 | 1 |
| TGP | 0 | 0 |
| TGG | 0 | 1 |
| TGT | 1 | 0 |
| TTP | 0 | 1 |
| TTG | 0 | 1 |
| TTT | 1 | 0 |

TABLE 5

| PGT | Zero0 | Zero1 |
|---|---|---|
| PPP | 0 | 0 |
| PPG | X → 0 | X → 0 |
| PPT | X → 0 | 0 |
| PGP | X → 0 | X → 1 |
| PGG | 0 | 1 |
| PGT | 0 | X → 1 |
| PTP | X → 1 | X → 0 |
| PTG | X → 1 | 0 |
| PTT | X → 1 | X → 0 |
| GPP | 1 | 1 |
| GPG | 1 | X → 1 |
| GPT | X → 1 | 1 |
| GGP | X → 1 | X → 0 |
| GGG | X → 1 | 0 |
| GGT | 1 | X → 0 |
| GTP | X → 0 | X → 1 |
| GTG | X → 0 | 1 |
| GTT | 0 | X → 1 |
| TPP | 1 | 1 |
| TPG | 1 | X → 1 |
| TPT | X → 1 | 1 |
| TGP | X → 1 | X → 0 |
| TGG | X → 1 | 0 |
| TGT | 1 | X → 0 |
| TTP | X → 0 | X → 1 |
| TTG | X → 0 | 1 |
| TTT | 0 | X → 1 |

TABLE 6

| PGT | Neg0 | Neg1 |
|---|---|---|
| PPP | X → 0 | X → 0 |
| PPG | X → 0 | 0 |
| PPT | 1 | X → 1 |
| PGP | 0 | 0 |
| PGG | 0 | 0 |
| PGT | X → 0 | 0 |
| PTP | 1 | 1 |
| PTG | 1 | X → 1 |
| PTT | 1 | 1 |
| GPP | 1 | 1 |
| GPG | 1 | 1 |
| GPT | 0 | 0 |
| GGP | 0 | 0 |
| GGG | 1 | X → 1 |
| GGT | 1 | 1 |
| GTP | 0 | 0 |
| GTG | 0 | 0 |
| GTT | X → 0 | 0 |
| TPP | 1 | 1 |
| TPG | 1 | 1 |
| TPT | 0 | 0 |
| TGP | 1 | 1 |
| TGG | 1 | X → 1 |
| TGT | 1 | 1 |
| TTP | 0 | 0 |
| TTG | 0 | 0 |
| TTT | X → 0 | 0 |

Shift0, Shift1, Zero0, Zero1, Neg0, and Neg1 denotes logical expressions Shift $Shift_{carry}$, $Zero_{no\text{-}carry}$, $Zero_{carry}$, $Negation_{no\text{-}carry}$, and $Negation_{carry}$, respectively. Meanwhile, when P, G, and T bit values of an PGT value are mutually exclusive, i.e., only one of three is in an active state '1', the instructions may be represented by simple logical Expression 2 below.

$$Shift_{no\text{-}carry} = P_n \text{ XOR } T_{n-1}$$

$$Shift_{carry} = P_n \text{ XOR } G_{n-1}$$

$$Zero_{no\text{-}carry} = \sim P_{n+1} \text{ XOR } T_n$$

$$Zero_{carry} = \sim P_{n+1} \text{ XOR } G_n$$

$$Negation_{no\text{-}carry} = P_{n+1} \text{ XOR } (G_n \text{ OR } (P_n \text{ AND } \sim T_{n-1}))$$

$$Negation_{carry} = P_{n+1} \text{ XOR } (G_n \text{ OR } (P_n \text{ AND } \sim T_{n-1})) \quad (2)$$

The second encoder 102 operating in accordance with Expression 2 and Tables 2 to 6 may be implemented using various methods.

Figure 4:
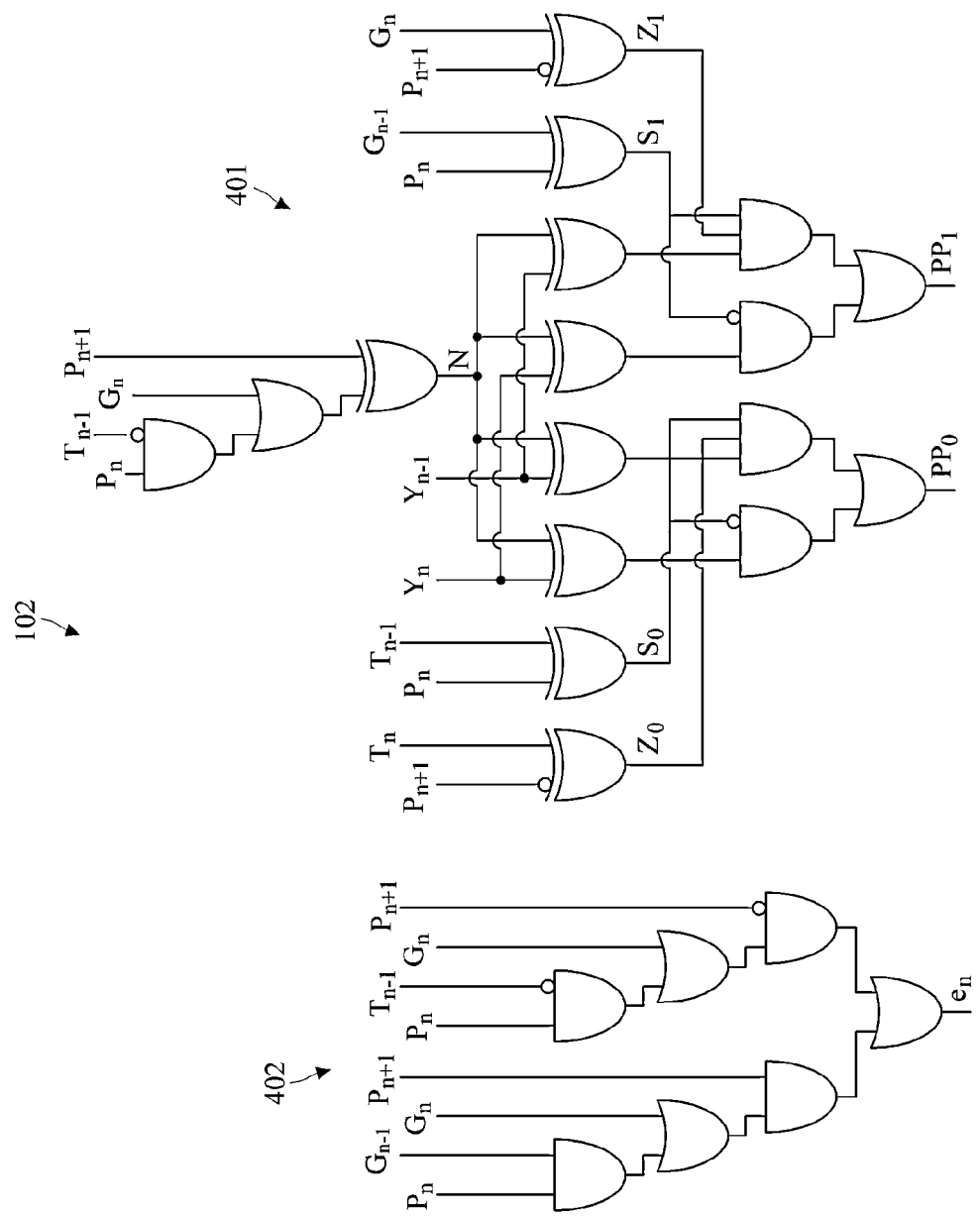
FIG. 4 is a diagram illustrating another example of a second encoder.

FIG. 4 is a diagram illustrating another example of the second encoder 102. The second encoder 102 includes a portion 401 configured to generate two candidate partial products $PP_0$ and $PP_1$, and a portion 402 configured to generate a carry estimation value $e_n$, based on XOR, AND, and OR logic gates. Although the second encoder 102 in the example of FIG. 4 includes the XOR, AND, and OR logic gates, this is only an example, and other logic gates may be used, such as an NOR logic gate, a NAND logic gate, and any other logic gate known to one of ordinary skill in the art.

In more detail, the portion 401 receives bit values $P_n$, $P_{n+1}$, $G_n$, $G_{n-1}$, $T_n$, and $T_{n-1}$ of PGT values and multiplicands $Y_n$ and $Y_{n-1}$, and generates bit values $S_0$, $S_1$, $Z_0$, $Z_1$, and N of logical expressions $Shift_{no\text{-}carry}$, $Shift_{carry}$, $Zero_{no\text{-}carry}$, $Zero_{carry}$, and Negation, respectively, based on the received bit values $P_n$, $P_{n+1}$, $G_n$, $G_{n-1}$, $T_n$, and $T_{n-1}$. Based on the bit values $S_0$, $S_1$, $Z_0$, $Z_1$, and N and the multiplicands $Y_n$ and $Y_{n-1}$, the portion 401 generates the candidate partial products $PP_0$ and $PP_1$. The portion 402 receives the bit values $P_n$, $P_{n+1}$, $G_n$, $G_{n-1}$, $T_n$, and $T_{n-1}$, and generates the carry estimation value $e_n$ based on the bit values $P_n$, $P_{n+1}$, $G_n$, $G_{n-1}$, $T_n$, and $T_{n-1}$.

Figure 5:
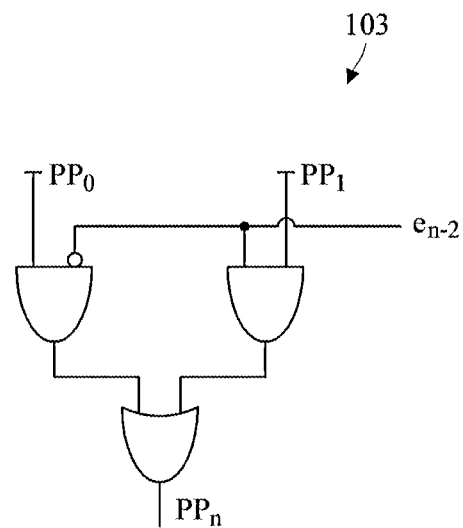
FIG. 5 is a diagram illustrating an example of a multiplexer.

FIG. 5 is a diagram illustrating an example of the multiplexer 103. The multiplexer 103 includes two AND logic gates and an OR logic gate. The multiplexer 103 receives two candidate partial products $PP_0$ and $PP_1$ at a reference bit position and a carry estimation value $e_{n-2}$ at a lower bit position. The multiplexer 103 selects one of the candidate partial products $PP_0$ and $PP_1$ based on the carry estimation value $e_{n-2}$, and outputs the selected candidate partial product as a final partial product $PP_n$. Although the multiplexer 103 in the example of FIG. 5 includes the AND and OR logic gates, this is only an example, and other logic gates may be used, such as additional AND logic gates and any other logic gate known to one of ordinary skill in the art.

Figure 6:
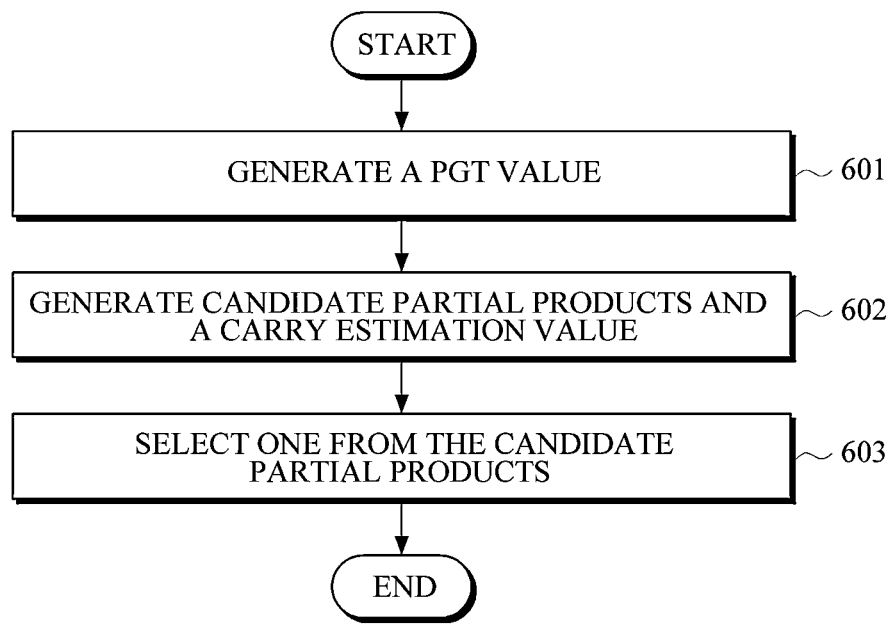
FIG. 6 is a flowchart illustrating an example of a method of generating a partial product for a polynomial operation.

FIG. 6 is a flowchart illustrating an example of a method of generating a partial product for a polynomial operation. Referring to FIG. 6 in conjunction with FIG. 1, in operation 601, an PGT value is generated. For example, the first encoder 101 generates and outputs, as the PGT value, one of P, G, and T values, which are defined as mutually exclusive values, based on two inputs related to a multiplier, as shown in Table 1 and Expression 1.

In operation 602, candidate partial products and a carry estimation value are generated. For example, the second encoder 102 generates two candidate encoding values and the carry estimation value based on PGT values at a reference bit position, an upper bit position, and a lower bit position with respect to bits of the inputs, as shown in Tables 2 to 6 and Expression 2. Then, the second encoder 102 generates the two candidate partial products by multiplying each of the encoding candidate values by a multiplicand.

In operation 603, one of the candidate partial products is selected. For example, the multiplexer 103 selects one of the candidate partial products based on a carry estimation value at the lower bit position.

According to the teachings above, there is provided an apparatus and a method for generating a partial product for a polynomial operation, namely, obtaining candidate partial products and a carry estimation value in parallel and in such a manner as to be only dependent on PGT values adjacent to a reference bit position and to be mutually exclusive. Hence, even when a bit length of inputs is increased, a delay due to carry propagation is reduced. For example, compared to a carry propagation adder (CPA) requiring a long period of processing time that is difficult to decompose, the apparatus shown in the above example includes a structure that is consistent, small and logically-divisible, is more effective for an increasing number of high-speed processing pipeline stages. Furthermore, since the structure described hereinabove includes a constant period of processing time even when the bit length of the inputs increases, the larger the multiplier this structure is applied to, the more the time delay decreases.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to generate a partial product for a polynomial operation, comprising:
    first encoders, each of the first encoders configured to selectively generate and output one of mutually exclusive values related to an occurrence of a carry and based on two inputs;
    a second encoder configured to generate and output two candidate partial products based on an output from a first one of the first encoders that is provided at a reference bit position of the inputs, an output from a second one of the first encoders that is provided at an upper bit position of the inputs, and a multiplicand; and
    a multiplexer configured to select one of the two candidate partial products based on the occurrence of the carry in a lower bit of the inputs,
        wherein the second encoder is further configured to generate and output a carry estimation value based on the output from the first one of the first encoders and the output from the second one of the first encoders and at a lower position with respect to bits of the two inputs.

2. The apparatus of claim 1, wherein the inputs are related to a multiplier.

3. The apparatus of claim 1, further comprising:
    another second encoder configured to
        generate and output another two candidate partial products based on an output from another first one of the first encoders that is provided at another reference bit position of the inputs, an output from another second one of the first encoders that is provided at another upper bit position of the inputs, the output from the second one of the first encoders, and the multiplicand, and generate another carry estimation value based on the output from the other first one of the first encoders, the output from the other second one of the first encoders, and the output from the second one of the first encoders; and another multiplexer configured to select one of the other candidate partial products output from the other second encoder based on the carry estimation value output from the second encoder.

4. The apparatus of claim 1, further comprising:

another second encoder configured to generate two candidate encoding values and another carry estimation value based on an output from another first one of the first encoders that is provided at another reference bit position of the inputs, an output from another second one of the first encoders that is provided at another upper bit position of the inputs, and the output from the second one of the first encoders, and multiply each of the candidate encoding values by the multiplicand to generate and output another two candidate partial products; and another multiplexer configured to select one of the other candidate partial products output from the other second encoder based on the carry estimation value output from the second encoder.

5. The apparatus of claim 4, wherein the candidate encoding values comprise a first candidate encoding value when the carry occurs in the lower bit, and a second candidate encoding value when the carry does not occur in the lower bit.

6. The apparatus of claim 4, wherein the other second encoder is further configured to generate the candidate encoding values and the other carry estimation value based on Radix-4 Booth encoding.

7. The apparatus of claim 4, wherein each of the second encoder and the other second encoder is provided at an even number bit position of the inputs.

8. The apparatus of claim 1, wherein the inputs comprise bit values of precedence partial products generated in a series of multiplication operations.

9. The apparatus of claim 1, wherein each of the first encoders is provided at a bit position of the inputs.

10. The apparatus of claim 1, wherein the mutually exclusive values comprise a P (Propagation) value, a G (Generation) value, and T (Termination) value.

11. The apparatus of claim 10, wherein:

the P value indicates a state in which the carry occurs in a reference bit of the inputs in response to a carry occurring in the lower bit;

the G value indicates a state in which the carry occurs in the reference bit; and the T value indicates a state in which the carry does not occur in the reference bit even when the carry occurs in the lower bit.

12. A method of generating a partial product for a polynomial operation, comprising:

generating Propagation Generation Termination (PGT) values based on two inputs, each of the PGT values being one of mutually exclusive values related to an occurrence of a carry, and the PGT values being at a reference bit position and an upper bit position, respectively, of the inputs;

generating a carry estimation value based on the PGT values;

generating two candidate partial products based on the PGT values and a multiplicand; and selecting one of the candidate partial products, based on the occurrence of the carry in a lower bit of the inputs.

13. The method of claim 12, wherein the inputs are related to a multiplier.

14. The method of claim 12, further comprising:

generating other PGT values based on the inputs, each of the other PGT values being one of the mutually exclusive values, and the other PGT values being at another reference bit position, another upper bit position, and the upper bit position, respectively, of the inputs;

generating two candidate encoding values and another carry estimation value based on the other PGT values;

multiplying each of the candidate encoding values by the multiplicand to generate another two candidate partial products; and selecting one of the other candidate partial products based on the carry estimation value.

15. The method of claim 14, wherein the candidate encoding values comprise a first candidate encoding value when the carry occurs in a lower bit of the inputs, and a second candidate encoding value when the carry does not occur in the lower bit.

16. The method of claim 12, wherein:

the mutually exclusive values comprise a P (Propagation) value, a G (Generation) value, and T (Termination) value;

the P indicates a state in which the carry occurs in a reference bit of the inputs in response to a carry occurring in the lower bit of the inputs;

the G indicates a state in which the carry occurs in the reference bit; and the T indicates a state in which the carry does not occur in the reference bit even when the carry occurs in the lower bit.

17. The method of claim 12, wherein the inputs comprise bit values of precedence partial products generated in a series of multiplication operations.

18. A non-transitory computer-readable storage medium storing a program comprising instructions to cause a computer to implement the method of claim 12.

* * * * *